United States Patent [19]
Sammet

[11] 3,927,514
[45] Dec. 23, 1975

[54] SELECTIVE ASPARAGUS HARVESTING UNIT

[75] Inventor: Aaron F. Sammet, Princeville, Ill.

[73] Assignees: Martin Farms Partnership; Joan of Arc Company, both of Princeville, Ill. ; part interest to each

[22] Filed: Mar. 28, 1974

[21] Appl. No.: 455,782

[52] U.S. Cl............................................... 56/327 A
[51] Int. Cl.². ......................................... A01D 45/00
[58] Field of Search........................ 56/327 A, 27.5

[56] References Cited
UNITED STATES PATENTS

| | | | |
|---|---|---|---|
| 3,426,516 | 2/1969 | Lyons | 56/327 A |
| 3,452,525 | 7/1969 | Francis | 56/327 A |
| 3,641,753 | 2/1972 | Lyons et al. | 56/327 A |
| 3,695,014 | 10/1972 | Alphin | 56/27.5 |

*Primary Examiner*—Russell R. Kinsey
*Attorney, Agent, or Firm*—Hill, Gross, Simpson, Van Santen, Steadman, Chiara & Simpson

[57] ABSTRACT

A selective asparagus harvesting unit which is adapted to be mounted on a transporting device, characterized by a frame rotatably supporting a reel or wheel having a pair of spaced sprockets with rods circumferentially spaced adjacent the periphery of the sprockets, a chain belt having a plurality of spaced rods extending between the two sprocket chains which are driven by the sprockets to move in a continuous closed path around additional guiding devices, a deflecting plate or bar disposed adjacent the sprocket and a device such as a box or a cross conveyor for receiving the harvested spears. During operation, the chain belt moves down an inclined portion of its path to receive the asparagus shoots between the spaced bars as the unit is transported across the plant. The shoot which extends through the chain belt engages a deflecting device which can be either a separate bar, or the bars on the reel which applies a bending force to snap those shoots which are greater than a desired length while enabling immature shoots to pass through the chain belt and the machine without damage.

17 Claims, 6 Drawing Figures

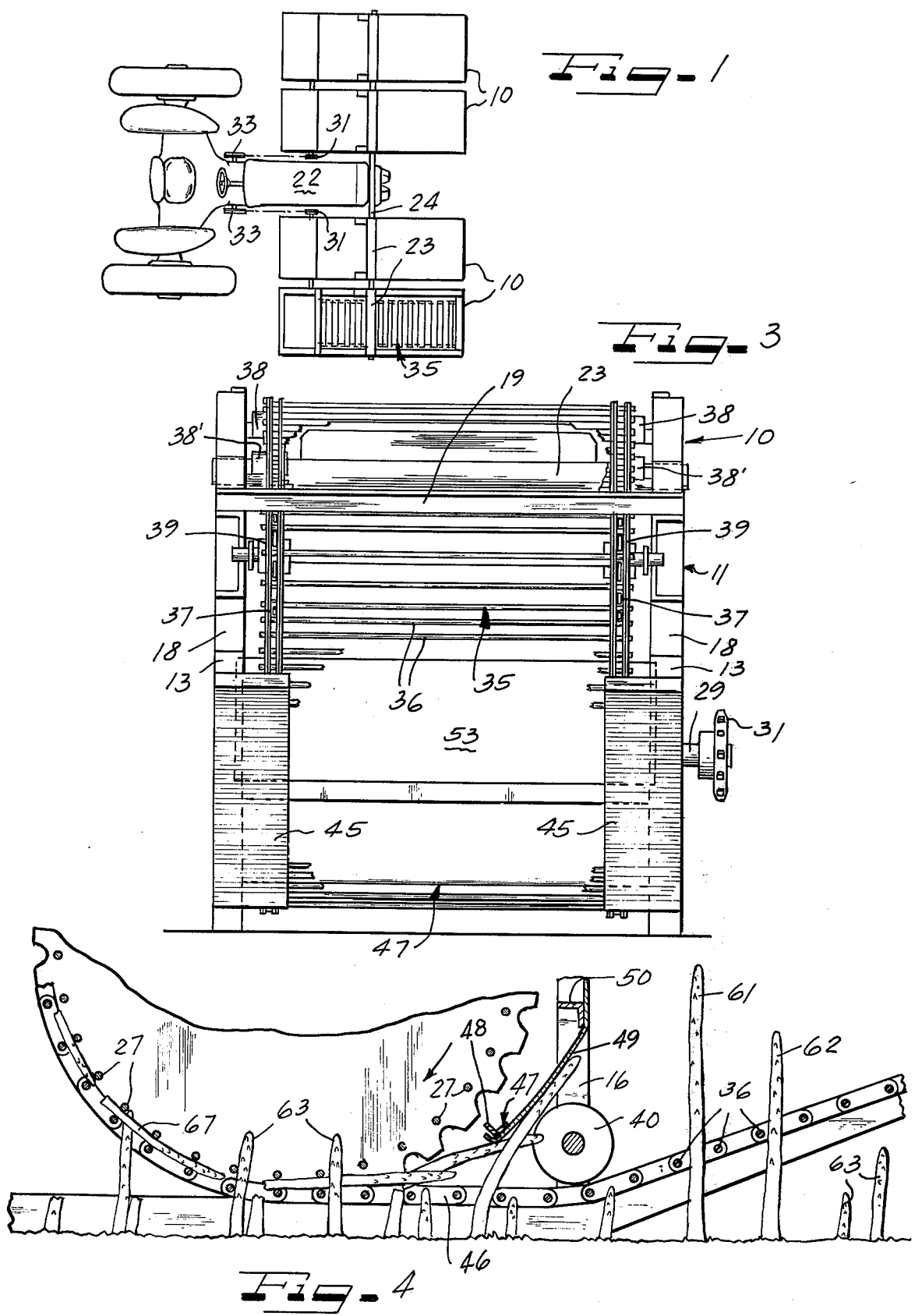

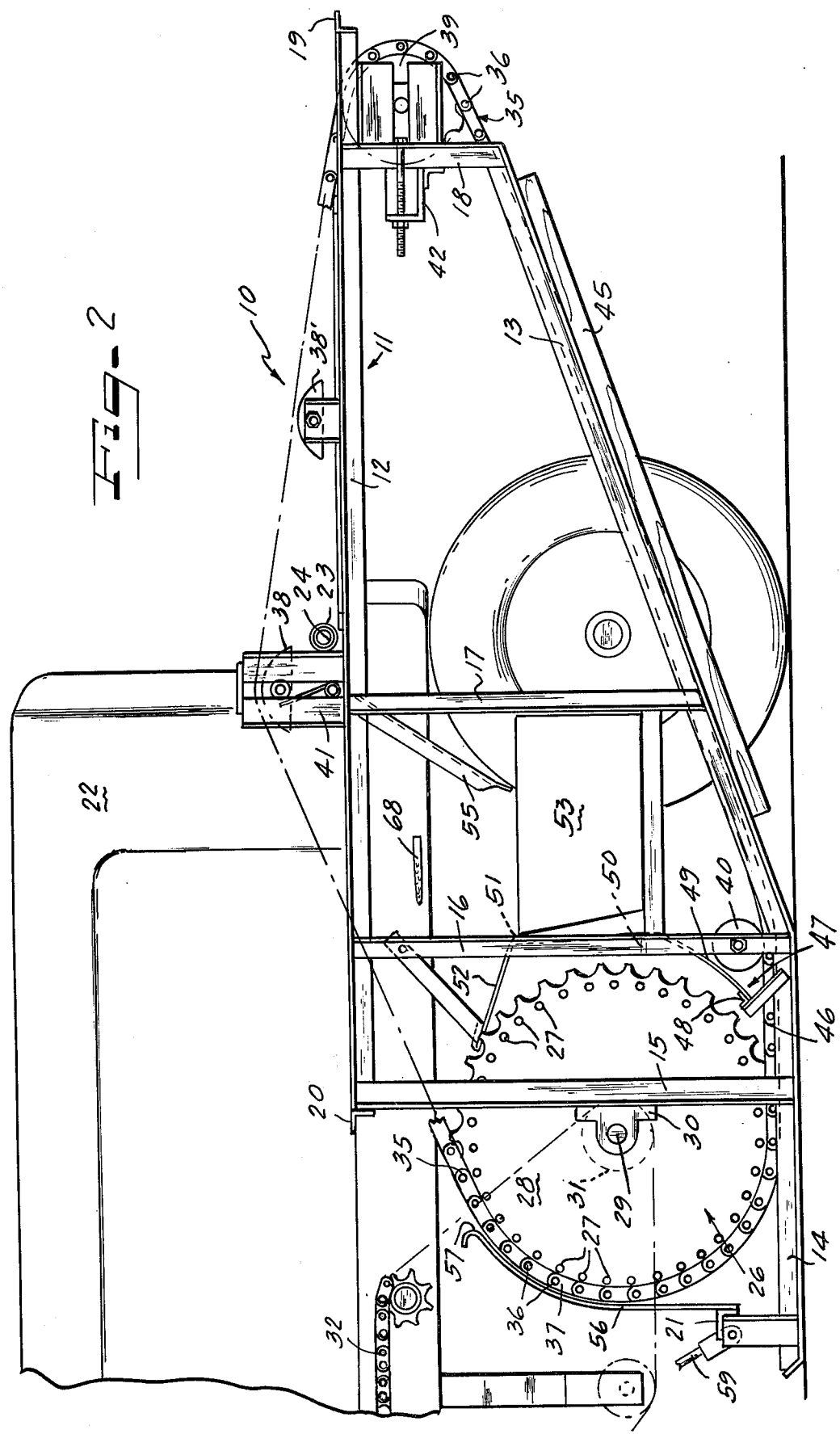

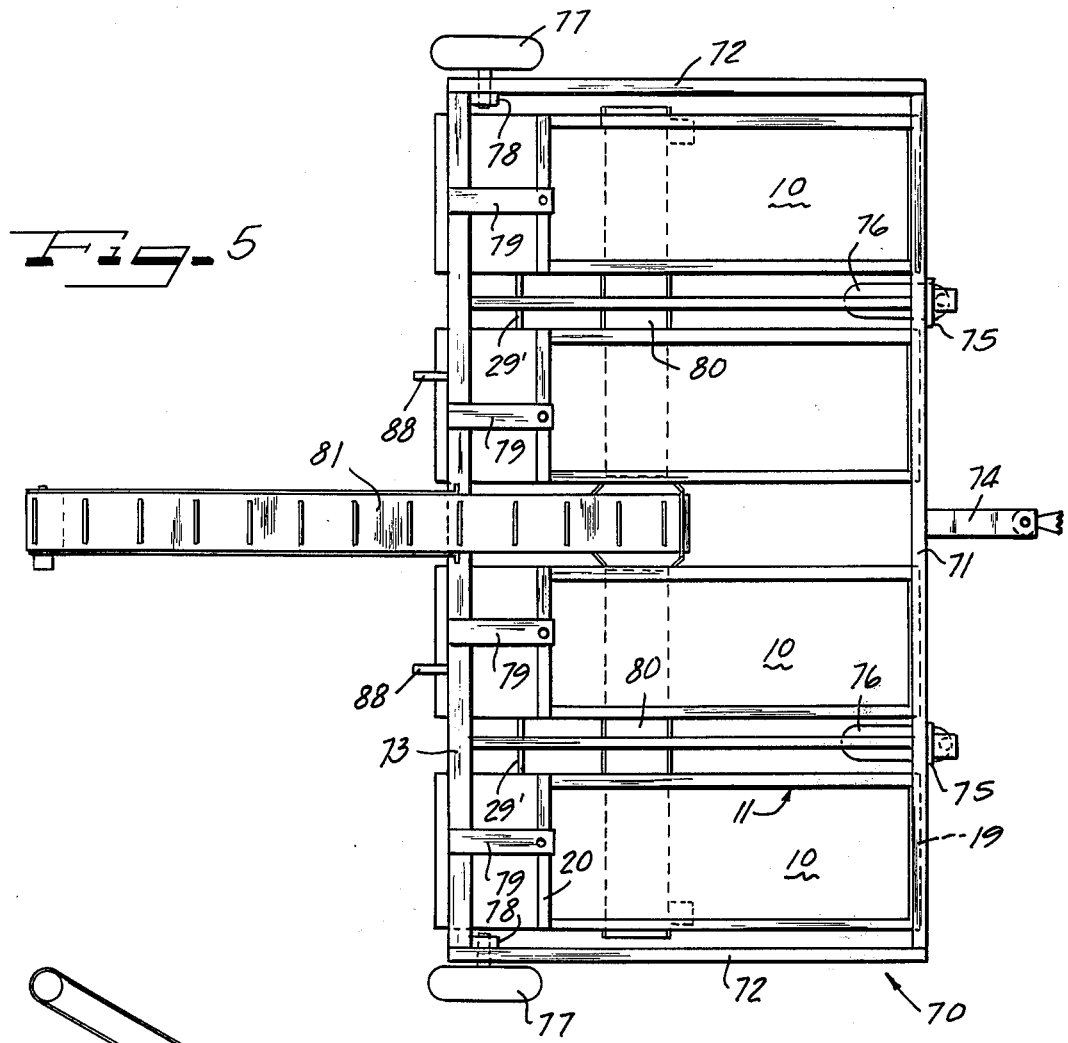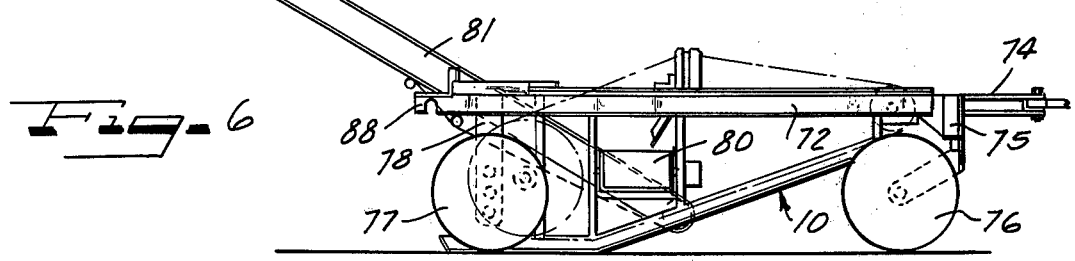

SELECTIVE ASPARAGUS HARVESTING UNIT

BACKGROUND OF THE INVENTION

1. Field of the Invention

The present invention is directed to a method and a unit for performing the method of selectively harvesting asparagus shoots without damaging the immature shoots.

2. Prior Art

Asparagus is a type of plant in which the shoots, spears or stalks can be broken or cut off when ready to be harvested. However, each asparagus plant will continue to produce new shoots during a harvesting period. Thus, while harvesting asparagus from a field, not all plants will have shoots of a harvestable size and even those plants having shoots of a harvestable size will have shoots which are not yet ready to be harvested. To obtain the maximum yield from a field of asparagus without damaging asparagus shoots which are not ready for harvesting, a selective harvest of the asparagus shoots must be performed.

A common method of harvesting asparagus is a manual harvesting method which enables selecting those shoots which are of the harvestable size while leaving undisturbed the shoots which are not ready for harvesting. Difficulties with the manual method are the high labor cost and the fact that workers are not always available during the harvest period.

To reduce labor costs, mechanical harvesting has been proposed. One such harvestor comprises a sled having a cutting bar or knife extending parallel to the ground at a fixed distance thereabove. As the sled is drawn along a row of asparagus plants, the knife cuts all shoots which extend above a fixed distance. A problem with such a mechanical device is that the knife also cuts the tops of immature shoots which have not obtained the desired length for harvesting. Furthermore, this type of device cuts weeds and grasses which may be adjacent the plants and during wet or muddy harvesting periods, will introduce a large amount of dirt into the harvested asparagus.

To the applicant's knowledge, the problem of providing a mechanical harvesting device or unit which selectively harvests asparagus shoots of a harvestable size without damaging immature shoots has not been solved.

SUMMARY OF THE INVENTION

The present invention is directed to a method and harvesting unit which will selectively harvest asparagus shoots, stalks or spears that have reached a predetermined harvestable size without damaging or disturbing immature shoots which have not reached the desired harvestable size. In addition, the method and apparatus of the present invention utilizes a principle of selectively harvesting which provides a clean harvest of asparagus shoots which harvest is substantially free of dirt and other foreign material such as weeds and grass.

To accomplish these tasks the unit of the present invention comprises a frame which is adapted to be mounted on a transporting device, means disposed in the frame for selectively snapping the shoots from their plants, and means disposed on the frame for receiving the snapped shoots. The means for selectively snapping includes a plurality of rod members interconnected in a closed loop with the rod members being substantially equally spaced and substantially parallel, means for moving the closed loop in a continuous path, said path having an inclined portion extending from adjacent a front end of the frame downward towards a lower frame portion which is adjacent the ground and a segment extending upward from the lower frame portion, and means disposed on the frame within the loop adjacent the segment and the inclined portion of the path for engaging an asparagus shoot which extends at least a predetermined distance through the rod elements and for coacting with the rod elements to snap the shoot from its plant without snapping any shoot which does not extend the predetermined distance. In the method, the closed loop as it moves on the incline path, is gradually guided toward the ground surface to receive each of the shoots in one of the spaces between the rods so that the shoots are entrapped by a pair of rods and then engaging these shoots which extend at least a given distance through the rods to deflect the shoot against the rod to cause snapping of the shoot from its plant. Preferably, the unit includes means for conveying the snapped shoots from a snapping means to means for collecting the snapped shoots. In the preferred embodiment, this conveying means comprises a second closed loop which is preferably formed by a selector wheel or reel having a plurality of bars extending between two spaced rims which reel is synchronously moved with the first closed loop so that the bars while moving in closely-spaced arcuate paths are in radial alignment so that a short shoot can extend between the bars of the closed loop and the bars on the reel and passes through the device without damage. The second-mentioned closed loop can be utilized as the deflecting means or a second deflecting element can be positioned on the frame immediately ahead of the second closed loop. Preferably, the first-mentioned closed loop is formed of a pair of sprocket chains with the rods extending therebetween and the spaced rims of the reel have sprocket gears for engaging and driving the sprocket chain for synchronous movement.

DESCRIPTION OF THE DRAWINGS

FIG. 1 is a plan elevation view of a row crop type tractor having a plurality of the harvesting units of the present invention mounted thereon;

FIG. 2 is an enlarged side elevational view of a harvesting unit of the present invention mounted on a row crop type tractor;

FIG. 3 is a front end view of a harvesting unit of the present invention;

FIG. 4 is a further enlarged partial cross section of the unit of the present invention diagrammatically illustrating the harvesting process;

FIG. 5 is a plan elevational view of four harvesting units according to the present invention mounted on a transporting device; and FIG. 6 is a side view of the transporting device of FIG. 5 with the harvesting unit mounted thereon.

DESCRIPTION OF THE PREFERRED EMBODIMENTS

The principles of the present invention are particularly useful in a harvesting unit generally indicated at 10 in FIG. 2. The unit 10 includes a frame 11 having a front end and rear end. The frame 11 is formed from a plurality of frame members which are angle iron members and has a pair of sides which are each formed by an upper frame member 12, a sloping frame member 13, a lower frame member 14, and vertically extending frame members 15, 16, 17 and 18. The two sides are interconnected by transverse frame members such as a front transverse bar 19, a rear transverse bar 20 and lower transverse bar 21. The frame 11 is provided with means for mounting the unit 10 on a transporting device.

As illustrated in FIGS. 1 and 2, one or more units 10 are mounted in parallel relation on a row crop tractor 22 with the necessary spacing between units so that each unit overlies a row of asparagus. To mount the units 10 on the tractor 22, each frame 11 is provided with a hollow tube 23 which telescopically receives a support member 24 mounted on a front end of the tractor 22.

A selector reel or wheel 26 is mounted for rotation on a rear portion of the frame 11. The selector reel 26 has a plurality of rod members 27 which extend between a pair of spaced sprocket gears or rims 28 which rims have sprocket teeth. The gears or rims 28 are mounted and keyed to a shaft or axle 29. The rods 27 are circumferentially spaced adjacent to the sprocket teeth so that as the reel 26 rotates, they move in a circular path. To mount the reel 26, the axle 29 is received in bearings such as 30 which are attached to the vertical member 15 of each of the side frames. The axle 29 is provided with a drive sprocket 31 which is connected by a chain drive 32 to a sprocket gear 33 on a cross shaft of row crop tractor 22 or can be connected to a sprocket gear mounted on a rear wheel of the tractor. If as illustrated in FIG. 1, two units 10 are in side-by-side relationship, the axles 29 may be interconnected so that both units are driven by a single chain drive.

The unit 11 has a closed or continuous chain belt 35 which is formed by a plurality of equally spaced parallel rods 36 which extend between a pair of closed loops such as sprocket chains 37. The chain belt 35 is received on the sprocket wheels 28 and is guided and supported by a plurality of guiding means. For example each chain 37 is guided in a closed and continuous path by the rims 28, guiding means 38,38' front or forward guiding means 39 and a lower idler roll 40. While the guiding means 38 and 38' are each illustrated as slide blocks, either one may be a idler roll and while front guide means 39 is illustrated as a sprocket gear, it may be replaced with an idler roll. Preferably, the slide block of guide means 38 is adjustably mounted in a vertical support 41 to enable varying the heighth of the path over the upper frame member 12. To provide tightening and alignment of the chains 37, the forward guiding means 39 are mounted by an adjustment device 42 to enable tightening the chain belt and making corrections in their alignment of the sprocket chains.

The path of the chain belt 35 has an arcuate segment about a center of curvature defined by the axle 29 of the reel 26. The radius of the arcuate segment is greater than the radius of the circle on which the rods 27 are spaced so that a surface-to-surface spacing between the radially aligned rods 27 and 36 is approximately one-half inch. Due to the presence of the position of the front guide means 39 and the idler roll 40, the path of the chain belt 35 has a downwardly inclined portion extending from the front end toward the guide roller 40. To aid in guiding the chain belt 35 along the incline portion and to help maintain the incline portion in a straight line having an inclination of approximately 18° to the horizontal plane, the sloping members 13 are each provided with chain slides 45. From the idler rolls 40 to the beginning of the arcuate segment of the path, the path has a horizontal segment or portion 46.

A deflecting means 47 is mounted to extend traversely across the frame above the horizontal segment 46 of the chain belt 35 and immediately forward of the reel 26. As illustrated, the deflecting means 47 comprises a bar member 48, which is positioned above the lower structural member 14, and a sheet metal shield 49, which is secured to the member 48. The shield 49 extends at an angle to the vertical direction to a transverse support 50 and then extends vertically to a point 51, which is defined by another transverse support. From the point 51, the shield has a portion 52 that extends rearwardly to a point adjacent the periphery of the path of the rods 27 of the reel 26.

The upper portion 52 of the sheet metal member or shield 49 forms a guide or slide for delivering snapped or picked asparagus into a collecting means which is illustrated in FIG. 2 as a box 53. A forward shield or side board 55 is mounted on the frame to slope downwardly toward the catching box 53 and as illustrated is mounted adjacent the frame portion 41.

A rear shield 56 is mounted on the transverse support 21 and extends vertically to tangentially intercept the rod 36 of the chain bar 35 and then is curved to follow these chain bars along their arcuate path to a point 57 where it is provided with a reinforcing upwardly reversed bend. The rear shield 56 is for the purpose of preventing the loss of the shorter shoots which were harvested from falling between the closely spaced rods 36 and 27 as they are conveying snapped asparagus upwardly for disposing in the catching means or box 53.

To maintain the lower frame member 14 substantially parallel with the ground, linkage means such as a rod 59 is connected to a transverse support such as 21 and extends to means for controlling the position of rear portion of the frame, such as a hydraulic cylinder arrangement disposed in the tractor 22. During transporting of the unit 10 from each row, the linkage 59 can be used to raise the rear end of the unit from the ground to prevent accumulation of dirt. When the linkage 59 is raised by a manual means or the hydraulic system, the unit will pivot in a clockwise manner about the pipe or bar received in the mounting pipe 23.

As best illustrated in FIG. 4, the harvesting unit 10 is carried by a transporting device such as the tractor 22 to travel along a row of asparagus plants having shoots such as 61 and 62 which are at a heighth for picking. As mentioned hereinabove, many of the shoots such as those identified as 63 are too short or immature for harvesting during a pass along a row of asparagus plants. As the unit 10 is transported along a row, the drive train 32, which is connected to a sprocket wheel 33 mounted on the tractor, drives the reel 26 at a peripheral speed such that the chain belt 35 is moving only approximately 5% faster than the speed of the unit along the row. Thus, as the chain belt is in the inclined portion, the rods 36 are with minimal or no horizontal movement relative to the ground surface.

As the unit 10 approaches the plant, the inclined portion of the path of the chain belt 35 gradually lowers the rods 36 between the shoots such as 61 and 62 and even the shorter shoots 63 between the spaced rods 36. As illustrated, the shoots such as 61 and 62 are entrapped between a pair of rods. Since the chain belt 35 has substantially no movement in the horizontal direction relative to the ground, the reel 26 and the deflecting means 47 effectively move toward each of the entrapped shoots 61, 62 and 63. Any shoot 61 or 62 which extends between and beyond the rods 36 more than a predetermined distance, will be engaged by the shield or sheet metal portion 49 and be deflected forward against the immediately adjacent rod 36. The deflecting force in coaction with the rods 36 may be sufficient to snap the shoot from the asparagus plant. However, under certain conditions, the shoot may pass beneath the member 48 without snapping and is then engaged by the moving rods 27 of the selector reel 26 which further deflect or bend the shoot toward the horizontal plane to ensure snapping of the shoot from the plant. A snapped shoot such as 67 is then gripped between the rods 27 of the reel 26 and the rods 36 and is conveyed in an upward arcuate path for discharging into the catching means 53 (FIG. 2). In most instances, particularly when the speed of travel along the row is sufficiently fast, the shoots will be thrown forward as illustrated by shoot 68 in FIG. 2 to strike the forward side board 55 which guides the shoot into the collection box 53. In some instances, particularly when operating at low speeds, the shoot may not be thrown forward but only onto the portion 52 which forms a rear side board and which will also lift any shoot which may be adhering to the rods 27 of the reel 26.

As mentioned above, there will be a plurality of immature or short shoots 63 intermixed with the shoots 61 and 62 of a harvestable size. These shoots 63 will pass under the deflecting means 47 and be received in the spaces between the rods 27 of the reel 26 as illustrated. Thus, the shoots 63 are not subjected to any bending forces which would cause their snapping from the plant and as the reel 27 and the chains continue moving along the row, they are discharged without any damage from the unit. In most instances, it should be noted that shoots having a heighth slightly taller than the lowest portion of the deflection sheet 49 will also be bent slightly and pass therebeneath and return to an upright position before being received in the decending rods 27 and thus will also be passed without being damaged.

As mentioned above, some of the shoots, such as 61 will be bent by the coaction between the rods 36 and the deflecting panel 49 to cause snapping from the plant. Whether this occurs or not may depend upon the particular weather conditions. For example, if harvesting is occurring during a cool day, the deflecting means comprises a transverse member 48 and the panel 49 will bend the majority of the harvestable shoots sufficiently to cause snapping. However, on a warm day, the shoots are more limber and require additional bending which is provided by the rods 27 of the reel moving into close proximity with the rods 36 of the chain belt 35.

As mentioned above, a majority of the weeds which may be in the row of asparagus will also pass into the snapping means. Due to their flexible and limber stalks, they can sustain the amount of bending applied without breaking and thus pass through the unit without being harvested along with the asparagus shoots. During experimental testing of a proto-type unit, it was discovered that the harvested shoots of asparagus are substantially clean and free of dirt.

As mentioned above, a field of asparagus during the harvest season is selectively harvested approximately every two or three days. Thus, the shoots such as 63 which were passed undamaged by the harvesting unit 10 will grow under normal conditions to a harvestable size in approximately two or three days and will be available for harvesting at that time.

It should be pointed out that another advantage of the present invention is that if due to weather conditions such as heavy rains a scheduled harvest is delayed for a day or two, the inclined path of the chain belt 35 is sufficiently high to enable picking or harvesting shoots which have obtained a heighth up to 20 inches above the ground. Thus, although it is desirable to pick the shoots prior to reaching such a heighth, if delays were encountered due to weather conditions, the harvesting unit 10 can still pick those shoots which have exceeded the desired picking heighth.

The chain belt 35 in conjunction with the shield 49 and the reel 26 forms means for snapping the shoots. The reel 26 in addition to insuring the snapping or harvesting of the selected shoots also acts with the chain belt 35 to form means for conveying the snapped or harvested shoots upwardly to the catching means. While the path of the rods 27 is a circular path and the reel provides a circular closed loop, a closed loop of spaced rods such as a second chain belt which is guided and moved in a continuous path of different configurations, could be utilized in place of the reel 26 and the deflecting means 47. However, the movement of the rods of both loops must be synchronized so that while they are in overlapping relationship an immature shoot is not damaged. To accomplish this movement, the drive means must be provided to drive both loops at the same linear speed.

While the unit 10 was discussed as being provided on a tractor 22 and is illustrated in FIG. 2 as having a box as a catching means for the harvested shoots, the unit 10 is adapted to be mounted on a transporting device 70, generally illustrated in FIG. 5. A transporting device 70 has a substantially rectangular frame with a forward frame member 71 interconnected by side frame members 72 to a rear frame member 73. A tongue 74 is mounted on the forward frame member which also is provided with mounting pads 75 for swivel wheels 76. Adjacent the rear frame member 73, gauge wheels 77 are provided and can be adjustably mounted on a vertical support 78.

Four harvesting units 10 are mounted in spaced relationship corresponding to the spacing of the rows of asparagus in the transporting device 70. To mount the units 10, the front transverse member 19 of each frame 11 of the unit 10 is provided with apertures to enable detachably connecting, such as by bolts, the front end of the frame to the front frame member 71 of the transporting device. The rear transverse member 20 of the frame 11 is provided with an aperture for receiving a bolt which detachably connects the rear of the unit to a structural member 79 which is attached to the rear frame member 73 of the transporting unit 70.

In the arrangement of FIG. 5, the catching means 53 has been replaced by a cross conveyor 80 which extends inwardly from the side member 72 and which catches the shoots harvested by the units 10. Each cross conveyor 80 transports the harvested shoots toward a centerline conveyor 81 which conveys them upwardly for discharge to a storage container or bin which is moving in a following relationship to the transporting device 70. Each of the conveyors 80 and the centerline conveyor 81 can be driven by hydraulic motors such as orbital motors.

The transporting device 70 on the rear frame member 73 is provided with hitch means 88,88 which enable the device to be mounted on a self-propelled push-type implement. An example of such an implement is a four row sweet corn picker which is provided with a detachable picking head which is removed and replaced by the transporting frame 70. When the transporting frame 70 is used with such a device, the centerline conveyor 81 discharges into a storage bin or hopper which is provided in the implement. To provide a motive force for each of the four units 10, the drive wheels on each side of the self-propelled device is provided with a sprocket gear which is connected in drive relationship with the common axle 29' of a pair of units by a chain drive. As in the previously described unit, the chain drive is selected so that the peripheral speed of the rims 28 of the reel 26 moves at a speed not more than 5% faster than the ground speed of the transporting device.

While the transporting device 70 is described as being used in place of a picking head on a self-propelled sweet corn picker, it is envisioned that the device can be drawn through the field by connecting a pull-type tractor to the draw bar 74. In such an arrangement, a wagon or other transportable container is attached to the rear of the transporting device 70 to receive the shoots conveyed by the centerline conveyor 81.

Although various minor modifications may be suggested by those versed in the art, it should be understood that I wish to employ within the scope of the patent granted hereon all such modifications as reasonably and properly come within the scope of my contribution to the art.

I claim:

1. A unit for selectively harvesting asparagus shoots as the unit is transported across an asparagus plant, said unit comprising:
   a frame having a plurality of members interconnected to form a front end, a rear end, a lower frame portion adjacent the rear end, and means for supporting the frame on a transporting device with the lower frame portion adjacent the ground surface;
   means disposed on the frame for selectively snapping shoots from their plants;
   means disposed on the frame for receiving the snapped shoots; and
   means disposed on the frame for conveying the snapped shoots from the snapping means to the receiving means;
   said means for selectively snapping including a plurality of rod members interconnected in a closed loop with the rod members being substantially equally spaced and being substantially parallel, means for supporting and moving the closed loop in a continuous path, said path having an inclined portion extending from adjacent the front end downward toward the lower frame portion and a segment extending upward from the lower frame portion, and said means for selectively snapping including means disposed on the frame within the loop adjacent the segment and the inclined portion of the path for engaging an asparagus shoot which extends at least a predetermined distance between and beyond the rod members, said means for engaging coacting with the rod members to snap the shoot from the plant without snapping any shoot which does not extend to said predetermined distance so that the shoots of at least a predetermined height are harvested while shorter shoots are left unharvested as the unit moves thereover.

2. A unit according to claim 1, wherein the conveying means includes a second closed loop of interconnected rod members which are substantially parallel and equally spaced, and means for supporting and moving the second closed loop in a second continuous path within the first-mentioned path, said second path having a portion closely spaced adjacent to the segment of the first-mentioned path to grip and transport snapped shoots from the area of the engaging means.

3. A unit according to claim 2, wherein the means for supporting and moving the second closed loop provides a second portion of the second path adjacent to the segment of the first-mentioned path, the rod members of the second closed loop while in said second portion acting as said means for engaging.

4. A unit according to claim 2, wherein said means for engaging is a transverse member mounted on the frame and wherein the means for supporting and moving the second closed loop provides a second portion of the second path adjacent to said means for engaging, the rod members of the second loop while in said second portion engaging shoots of said predetermined height and coacting with the rod members of the first-mentioned loop to apply an additional snapping force to the engaged shoot to ensure snapping of the selected shoots from their plants.

5. A unit according to claim 1, wherein the means for supporting and moving supports the path with the segment being an arcuate segment of a given radius from a center of curvature and wherein the means for conveying include means coacting with the arcuate segment for transporting the snapped shoots to the means for receiving.

6. A unit according to claim 5, wherein the means for coacting comprises a plurality of rod members interconnected in a second closed loop with the rod members being substantially equally spaced and being substantially parallel, means for supporting and moving the second closed loop in a continuous second path having at least an arcuate portion having a center of curvature of the arcuate segment and a radius less than the given radius so that at least a portion of the second path is contiguous and spaced from the arcuate segment of the first-mentioned path, and means synchronizing the moving means of each closed loop so that the rod members of each loop are radially aligned during movement through the contiguous portion of their respective paths.

7. A unit according to claim 6, wherein said means for supporting and moving the second loop provides the second path with a second portion adjacent the contiguous portion acting as the means for engaging.

8. A unit according to claim 6, wherein said means for engaging is a transverse member mounted on the frame and wherein said means for supporting and moving the second loop provides the second path with a second portion for engaging a shoot and for coacting with the rod members of the first-mentioned loop to apply an additional snapping force to the shoot to ensure snapping of the selected shoots from their plants.

9. A unit according to claim 6, wherein the means for supporting and moving the second closed loop moves the second closed loop in a circular path about the center of curvature of the arcuate segment.

10. A unit according to claim 9, wherein the plurality of rod members forming the first-mentioned closed loop extending between a pair of spaced sprocket chains, wherein the means for supporting and moving the second closed loop includes a pair of spaced rim members mounted for rotation on said frame, said rim members supporting the rod members of the second closed loop in circumferentially spaced relationship, and wherein the means for synchronously moving comprises a plurality of sprocket teeth on the spaced rim members engaging the sprocket chain of the first-mentioned closed loop.

11. A unit according to claim 1, wherein the means for supporting and moving the closed loop provides the path between the inclined portion and the segment with a straight portion extending substantially parallel to the ground surface and wherein the means for engaging is positioned adjacent the straight portion.

12. A unit for selectively harvesting asparagus shoots as the unit is transported across an asparagus plant, said unit comprising:
 a frame having a plurality of members interconnected to form a front end, a rear end, a lower frame portion adjacent the rear end and means for supporting the frame on a transporting device with the lower frame portion adjacent the ground surface;
 a selector reel having a pair of spaced rims with a plurality of parallel rod members circumferentially spaced adjacent to the periphery of the rims,
 means mounting the reel adjacent the rear end of the frame for rotation about an axis extending transverse to the length of the frame to move the rod member in a circular path having a lowest point spaced adjacent to the lower frame portion;
 a pair of spaced closed loops having a plurality of rod members extending therebetween and equally spaced therealong to form a continuous belt,
 means including the spaced rims of the reel for mounting said belt for movement along a continuous path in the frame,
 said rims providing a portion of the continuous path with an arcuate segment coaxial with the axis of the reel and said continuous path having an inclined portion extending from adjacent the front end of the frame downward towards the lower frame portion,
 means mounted on the frame in front of the reel and within the continuous belt for receiving and collecting harvested asparagus shoots, and
 means mounted in the frame within the continuous belt and forward of the reel for engaging shoots of asparagus which extend between and beyond the rods of the belt a predetermined distance and for coacting with each rod to apply a bending force to the engaged shoots so that the coacting of the engaging means and rods of the belt either alone or in combination with the rods of the reel apply a sufficient force to snap a shoot of at least a desired height from its plant without damaging a shorter unharvested shoot as the unit passes over the plant.

13. A unit according to claim 12, wherein the mounting means for the belt includes a guide mounted on the lower frame portion to provide a substantially horizontal path segment between the inclined portion and arcuate segment.

14. A unit according to claim 12, wherein each of the pair of closed loops is a sprocket chain and wherein each of the pair of rims is provided with sprocket teeth engaging its respective chain so that rotation of the reel synchronously drives the belt.

15. A method of selectively harvesting asparagus shoots which exceed a given height with a unit having a plurality of rod elements interconnected in a closed loop of spaced and parallel rod elements, comprising the steps of moving the unit over an asparagus plant having at least one shoot extending above the ground surface, gradually guiding the closed loop with the rod elements extending transverse to the direction of movement toward the ground surface to receive and entrap each of the shoots in spaces between the rod elements as the unit moves over the plant, engaging each of the entrapped shoots having a length of at least the given height to deflect the engaged shoot against an adjacent rod element to snap the shoot from its plant without snapping the shoots having a height less than the given height, conveying the snapped shoots and collecting the conveyed shoots.

16. A method according to claim 15, wherein the step of conveying includes conveying the snapped shoots in an upward direction and the step of collecting comprises collecting the upwardly conveyed shoots.

17. A method according to claim 15, wherein the step of engaging includes initially deflecting each of the shoots of the given height to pass under a member and then progressively moving the deflected shoot toward a horizontal plane to insure snapping of the deflected shoot from the plant.

* * * * *